United States Patent [19]

Arnold et al.

[11] Patent Number: 4,786,202
[45] Date of Patent: Nov. 22, 1988

[54] DUAL LOAD PATH PIN CLEVIS JOINT

[75] Inventors: Alison M. Arnold, Greenbank; Ronald G. Reed, Renton, both of Wash.

[73] Assignee: The United States of America as represented by the Secretary of the Air Force, Washington, D.C.

[21] Appl. No.: 700,857

[22] Filed: Feb. 12, 1985

[51] Int. Cl.⁴ .......................... B25G 3/00; F16D 1/00
[52] U.S. Cl. ........................................ 403/79; 403/11; 403/156
[58] Field of Search .................. 403/157, 158, 11, 70, 403/71, 79, 376, 13, 156

[56] References Cited

U.S. PATENT DOCUMENTS

| | | | |
|---|---|---|---|
| 1,396,176 | 11/1921 | Fokker | 403/161 |
| 2,603,437 | 7/1952 | Satre | 244/131 X |
| 3,594,851 | 7/1971 | Swatton | 403/156 X |
| 3,923,349 | 12/1975 | Herbst | 403/79 X |
| 4,139,245 | 2/1979 | McCloskey | 403/156 |
| 4,183,687 | 1/1980 | Bramwell | 403/161 X |
| 4,227,425 | 10/1980 | Bendall | 403/161 X |
| 4,243,192 | 1/1981 | Johnson | 403/158 X |
| 4,371,280 | 2/1983 | Handke et al. | 403/13 |
| 4,435,100 | 3/1984 | Cox | 403/11 X |
| 4,558,881 | 12/1985 | Manteufel | 403/79 X |

Primary Examiner—David H. Brown
Attorney, Agent, or Firm—Bobby D. Scearce; Donald J. Singer

[57] ABSTRACT

A novel dual load path connector for pivotally joining a movable member to a structural member, is described which comprises a pair of spaced apart lugs attached to a first of the members, each of the lugs including an outwardly projecting boss, a clevis disposed between the lugs and attached to the first member, a pivot pin, received by the lugs and clevis, which may support a self-aligning bearing between the ends of the clevis, and a connecting link assembly including a first connecting link pivotally supported at a first end on the pin and connected at the other end to the second member, and a pair of second connecting links pivotally supported at respective first ends on the bosses and at the second ends to the second member, the first connecting link, pin and clevis providing a first load bearing path between the structural and movable members, and the second connecting links, bosses and lugs providing a second load bearing path. Alternatively, a pair of spaced apart fail safe lugs attached to the first member and a pair of flanged bushings received by the lugs may be utilized to provide a first load bearing path along the first connecting link, pin and lugs and a second load bearing path along the second connecting links, flanged bushings, and lugs. In a further embodiment, two pairs of spaced apart lugs are attached to the first member and a pair of flanged bushings are received by the respective lug pairs to provide a first load bearing path along the first connecting link, pin and one lug pair, and a second load bearing path along the second connecting links, bushings, and the other lug pair; projecting bosses may be provided on one lug pair of fuctionally replace the flanged bushings in the second load bearing path. In each embodiment including a bearing the second link members may be pivotally connected with large tolerances to permit the first link to pivot about an axis perpendicular to the axis of the pin to impart a degree of self-alignability to the connector.

5 Claims, 2 Drawing Sheets

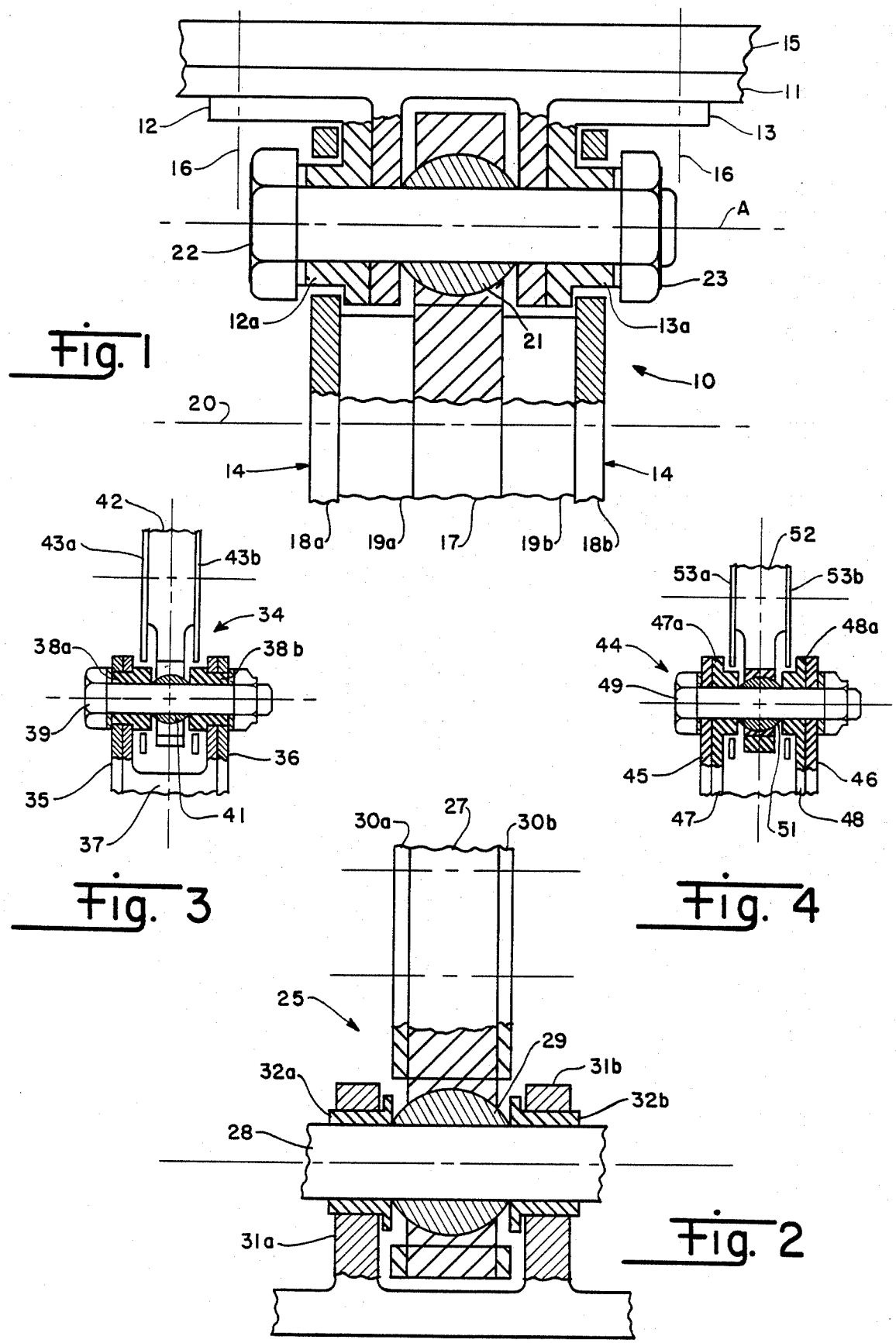

४,७८६,२०२

DUAL LOAD PATH PIN CLEVIS JOINT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to multiple load path connectors for fail-safe structural or load carrying mechanical joints and more particularly to a novel pinned clevis or double lug pair connection wherein two separate load bearing paths are provided to carry a load in a fall-safe manner, one path carrying the load upon failure of the other.

Prior attempts to provide multiple load path joint connectors have included use of a pin-within-a-pin arrangement and dual clevis or lugs. Also, large diameter pins have been used to provide a low stress level and extended safe life design. These solutions may ordinarily be suitable when sufficient space exists for their installation. However the use of large diameter pins requires large lug or clevis dimensions, and, if bolt clamp-up is desired for preloads in reducing bolt bending stresses, large size bolt heads and nuts are also required. For certain applications such as in the mechanical linkages for movable airfoils on aircraft, unlimited working space and weight allowance are not available. Multiple load path connections may nevertheless be required for safe life aircraft design for redundant structural or mechanical connections in areas where a single failure may result in loss of the aircraft.

The present invention provides a novel single pin structural or mechanical joint including a primary and a standby load path across the joint. The pivotal connector configuration disclosed herein may be applicable to simple pin joints or to self-aligning joints requiring rotational alignment about axes other than the pin axis. The invention provides a mechanical joint which may include both safe life and dual load path characteristics and which may be inspected for component failure without disassembling the joint. Further, the present invention avoids space availability problems characteristic of existing structures wherein space for self-aligning joints in a diametrical direction may be limited, which may be characteristic of certain existing thin wing fighter aircraft, by using slightly increased amount of space in an axial direction which is often available.

It is, therefore, a principal object of the present invention to provide an improved multiple load path connector.

It is a further object of the invention to provide a dual load path, fail safe, single pin connector for structural or mechanical joints.

It is a further object to Provide a self-aligning dual load path pivotal connector for control linkage or support for movable airfoils on aircraft.

These and other objects of the present invention will become apparent as the detailed description of certain representative embodiments thereof proceeds.

SUMMARY OF THE INVENTION

In accordance with the foregoing principles and objects of the present invention, a novel dual load path connector for pivotal joining a movable member to a structural member is described which comprises a pair of spaced apart lugs attached to a first of the members, each of the lugs including an outwardly projecting boss, a clevis disposed between the lugs and attached to the first member, a pivot pin, received by the lugs and clevis, which may support a self-aligning bearing between the ends of the clevis, and a connecting link assembly including a first connecting link pivotally supported at a first end on the pin and connected at the other end to the second member, and a pair of second connecting links pivotally supported at respective first ends on the bosses and at the second ends to the second member, the first connecting link, pin and clevis providing a first load bearing path between the structural and movable members, and the second connecting links, bosses and lugs providing a second load bearing path. Alternatively, a pair of spaced apart fail safe lugs attached to the first member and a pair of flanged bushings received by the lugs may be utilized to provide a first load bearing path along the first connecting link pin and lugs and a second load bearing path along the second connecting links, flanged bushings, and lugs. In a further embodiment, two pairs of spaced apart lugs are attached to the first member and a pair of flanged bushings are received by the respective lug pairs to provide a first load bearing path along the first connecting pin and one lug pair and a second load bearing path along the second connecting links, bushings, and the other lug pair; projecting bosses may be provided on one lug pair to functionally replace the flanged bushings in the second load bearing path. In each embodiment including a bearing the second link members may be pivotally connected with large tolerances to permit the first link to pivot about an axis perpendicular to the axis of the pin to impart a degree of self-alignability to the connector.

BRIEF DESCRIPTION OF THE DRAWINGS

The present invention will be more clearly understood from the following detailed description of certain representative embodiments thereof read in conjunction with the accompanying drawings wherein:

FIG. 1 is an axial sectional view of an embodiment of the present invention comprising a dual load path pin and clevis joint.

FIG. 2 is an axial sectional view of an embodiment including a pinned joint with bushings and safe life lugs.

FIG. 3 is an axial sectional view of an embodiment including double lug pairs and bushings.

FIG. 4 is an axial sectional view of an embodiment including double lug pairs, one pair including boss projections.

DETAILED DESCRIPTION

Figure 5:
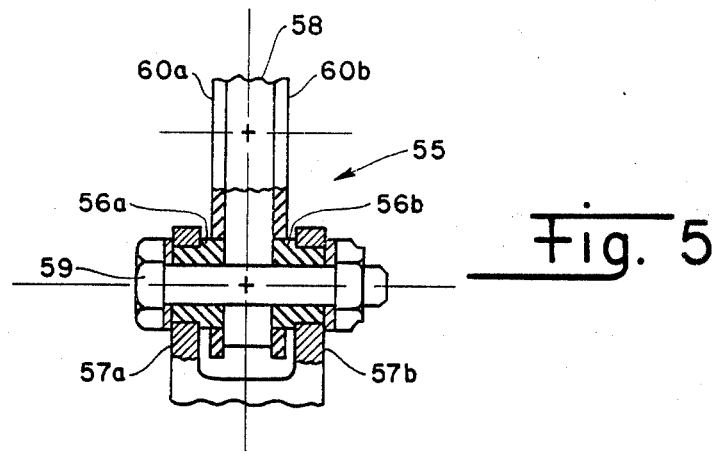
FIG. 5 is an axial sectional view of a non-self-aligning pinned joint with bushings and safe life lugs.

Referring now to FIG. 1, shown therein is a sectional view of one embodiment cf the present invention comprising a self-aligning pinned joint including a clevis and lug pair to provide a dual load path. Dual load path joint 10 may preferably comprise a connecting member in the form of a clevis 11 and a pair of lugs 12,13 on either side of clevis 11 for making connection between a load path linkage assembly 14 and a load carrying or structural member 15. Clevis 11 and lugs 12.13 may be joined to structural member 15 conventionally, as by bolts 16 or the like. Lugs 12,13 include boss protrusions 12a, 13a machined thereon for carrying linkage assembly 14 in part as hereinbelow detailed.

The multiple load path linkage assembly 14 may comprise three linkage member sets each, including a center member assembly 17 between two outer member assemblies 18a,18b, separated by spacers 19a,b, as suggested in FIG. 1. Linkage member sets 17,18a, 18b, and 19a,19b may be connected seriatim by bolts, pivot pins or the like as represented schematically the broken centerline 20. The function of the linkage member assembly 14 is to feed the load from or into joint 10 for transfer from or to structural member 15 through clevis 11 and alternatively through lugs 12,13. The connecting end of center member assembly 17 of linkage assembly 14 includes a self-aligning hearing 21 received between the ends of clevis 11 and supported on transversely disposed threaded pin 22 along assembly axis A through the eyelets of clevis 11. The connecting ends of outer member assemblies 18a,18b of linkage assembly 14 are received on boss protrusions 12a,13a, substantially as shown in FIG. 1. A nut 23 on threaded pin 22 secures the assembly together as shown.

The center linkage member 17 carried out on self-aligning bearing 21 comprises the normal load carrying member in the linkage assembly; the outer members 18a,18b, which may preferably include oversize holes for receiving boss protrusions 12a,13a, comprise the alternate or standby load bearing members The normal or primary load bearing path is therefore along center member 17, self-aligning bearing 21. Pin 22, and clevis 11 to load carrying structural member 15. The standby load path along outer member assemblies 18a,18b, bosses 12a,13a and lugs 12,13 assumes the load upon failure of an element along the primary load path. The pivotal connections between members 18a,18b with bosses 12a,13a may be characterized by large assembly clearances to permit some rotation of center member 17 on self-aligning bearing 21 about an axis perpendicular to axis A, in order for joint 10 to be self-aligning with respect to the direction of load application.

FIG. 2 illustrates an axial sectional view of a pinned joint 25 including bushings and safe life lugs. In joint 25, the primary load path is along center linkage member assembly 27 pivotally supported on pin 28 through a self-aligning bearing 29 in fashion similar to the joint 10 configuration of the FIG. 1 embodiment. The secondary load path linkage member assemblies 30a,30b are pivotally connected to safe life lugs 31a,31b through a pair of flanged bushings 32a,32b received by the eyelets of lugs 31a,31b and enclosing self-aligning bearing 29 therebetween. As with joint 10 of FIG. 1, the assembly clearances of linkage members 30a,30b may be large to allow some pivoting of linkage member 27 on self-aligning bearing 29, thereby allowing the entire joint 25 to be self-aligning.

FIG. 3 presents an alternative configuration similar to that shown in FIG. 2 and including dual lug pairs of redundancy rather than safe life lugs. Accordingly, joint 34 of FIG. 3 includes outer lugs 35,36 and an inner lug 37 carrying a pair of flanged bushings 38a,b on threaded pin 39. Self-aligning bearing 41 is pivotally supported on pin 39 and carries one end of center link member assembly 42. The connecting ends of outer link member assemblies 43a,43b are pivotally connected on the flanges of bushings 38a,b. Therefore, center link member assembly 42, self-aligning bearing 41 and inner lug 37 may comprise one (primary) load path to a structural load carrying member (not shown), and outer link member assemblies 43a,b, bushings 38a,b and outer lugs 35,36 may comprise the alternate or standby load path.

FIG. 4 presents a joint 44 similar to that of FIG. 1, but includes dual load path lug pairs comprising outer lugs 45,46 and inner lugs 47,48 and buss projections 47a,48a on the inner lug pair. Accordingly, in joint 44 of the FIG. 4 embodiment, the primary load path is along center link member assembly 52, self-aligning bearing 51, pin 49 and outer lugs 45,46 to the structural load bearing member (not shown). The standby load path is along outer link member assemblies 53a,53b, bosses 47a,48a and inner lugs 47,48. Bosses 47a,48a included on the inner surfaces of lugs 47,48 immediately adjacent self-aligning bearing 47 provide somewhat greater tolerance limits at the outer lugs 45,46 along the secondary or standby load path, which may give center linkage assembly 52 somewhat more rotational freedom on self-aligning bearing 51, and consequently somewhat greater degree of self-alignability to joint 44, than that which characterized the other described embodiments.

FIG. 5 illustrates an axial sectional view of a non-self-aligning, dual load path pinned joint 55 including bushings and safe life lugs. In joint 55, the primary load path is along center linkage member assembly 58 pivotally supported on pin 59 to safe life lugs 57a,57b. The secondary load path is along outer linkage member assemblies 60a,60b which pivotally connected to lugs 57a,57b through a pair of flanged bushings 56a,56b received by the eyelets of lugs 57a,57b.

Figure 6:
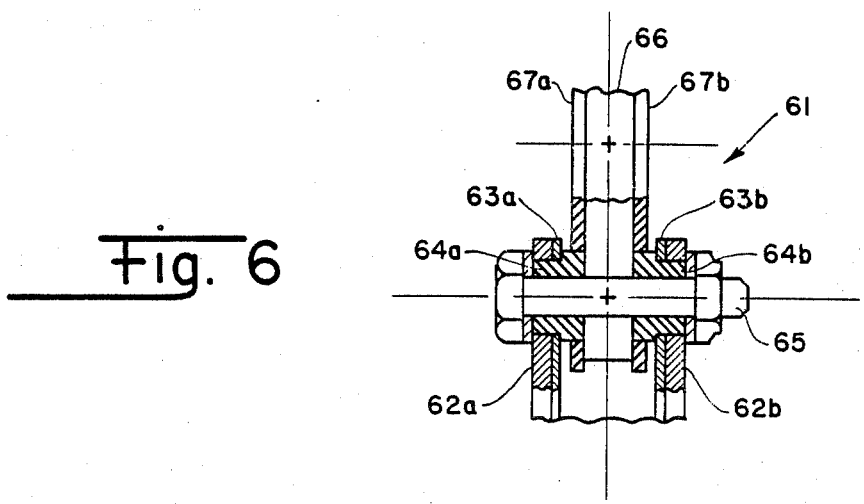
FIG. 6 is an axial sectional view of a non-self-aligning pinned joint including double lug pairs and bushings.

FIG. 6 presents alternative non-self-aligning configuration including dual lug pairs for load path redundancy rather than safe life lugs. Accordingly, joint 61 of FIG. 6 includes outer lugs 62a,62b and inner lugs 63a,63b carried on a pair of flanged bushings 64a,64b and threaded pin 65. Pin 65 carries one end of center link member assembly 66. The connecting ends of outer link member assemblies 67a,67b are pivotally connected on the flanges of bushings 64a,64b. Therefore, center link member assembly 66, pin 65 and inner lugs 63a,63b may comprise the primary load path to a structural load carrying member (not shown), and outer link member assemblies 67a,67b, bushings 64a,64b and outer lugs 62a,62b may comprise the standby load path.

Figure 7:
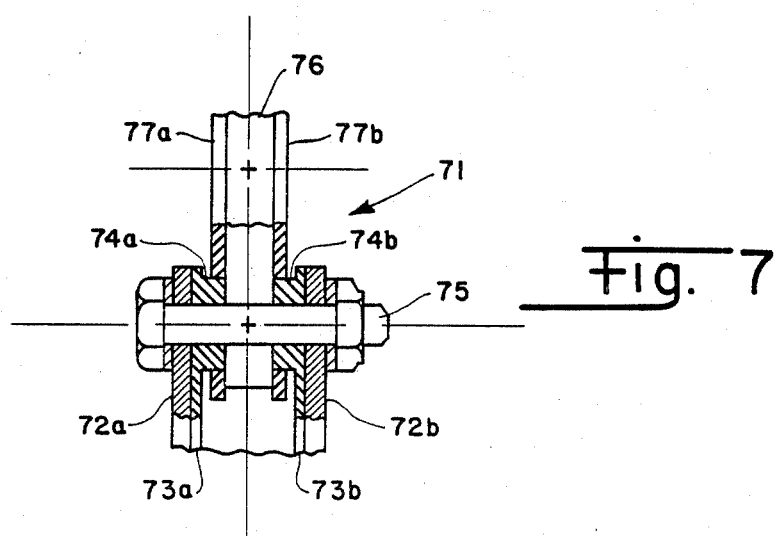
FIG. 7 is an axial sectional view of a non-self-aligning pinned joint including double lug pairs, one pair including boss projections.

FIG. 7 presents a non-self-aligning joint 71 including dual load path lug pairs comprising outer lugs 72a,72b and inner lugs 73a,73b and boss projections 74a,74b on the inner lug pair. Accordingly, in joint 71, the primary load path is along center link member assembly 76, pin 75 and outer lugs 72a,72b to the structural load bearing member (not shown). The standby load path is along outer link member assemblies 77a,77b, bosses 74a,74b and inner lugs 73a,73b.

In each of the described embodiments, a secondary of standby load path through the joint provides means to carry a load through the joint in the event of failure of an element along the primary load carrying path. It is instructive to note that the secondary load paths of the joints in each of the described embodiments will carry the load in the event of failure of the pin, and even if the pin is removed.

The present invention therefore provides a novel dual load path and self-aligning pinned connector for pivotally movable, load carrying joints. It is understood that certain modifications to the invention as described may be made, as might occur to one with skill in the field of this invention, within the scope of the appended claims. Therefore, all embodiments contemplated hereunder which achieve the objects of the present invention have not been shown in complete detail. Other embodiments may be developed without departing from the spirit of the invention or from the scope of the appended claims.

We claim:

1. A dual loading bearing path connector for pivotally joining a movable member to a structural member, comprising:
   a pair of spaced apart lugs, each said lug including at a first end thereof means for attachment to one of said movable member and said structural member, each said lug further including at a second end thereof means defining an eyelet and an outwardly projecting boss;
   a clevis disposed between said lugs and including means for attachment to said first member, said clevis having an eyelet defined in the end of each leg thereof disposed in registration with a corresponding eyelet in said lugs;
   a pivot pin received by the eyelets of said lugs and said clevis;
   a self-aligning bearing, supported on said pin between the legs of said clevis;
   a first connecting link pivotally supported at a first end on said bearing, and disposed for operative connection at a second end to the other of said movable member and said structural member, said first connecting link, bearing, pin and clevis providing a first load bearing path between said structural member and said movable member; and
   a pair of second connecting links, pivotally supported at respective first ends on a corresponding said projecting boss of said lugs, and disposed for operative connection at respective second ends to the other of said movable member and said structural member, said second connecting links, projecting bosses, and lugs providing a second load bearing path between said structural member and said movable member.

2. The connector as recited in claim 1 wherein each of said second connecting links includes an oversize hole at the first end thereof for receiving a said projecting boss thereby permitting said first link to pivot on said self-aligning bearing about an axis perpendicular to the axis of said pin whereby said connector may be self-aligning.

3. The connector as recited in claim 1 further comprising means for connecting said second connecting links to said first connecting link for movement therewith.

4. A dual load bearing path connector for pivotally joining a movable member to a structural member, comprising:
   a pair of spaced apart lugs, each said lug including at a first end thereof means for attachment to one of said movable member and said structural member, each said lug further including at a second end thereof means defining an eyelet and an upwardly projecting boss;
   a clevis disposed between said lugs and including means for attachment to said first member, said clevis having an eyelet defined in the end of each leg thereof disposed in registration with a corresponding eyelets in said lugs;
   a pivot pin received by the eyelets of said lugs and said clevis;
   a first connecting link pivotally supported at a first end on said pin, and disposed for operative connection at a second end to the other of said movable member and said structural member, said first connecting link, pin and clevis providing a first load bearing path between said structural member and said movable member; and
   a pair of second connecting links, pivotally supported at respective first ends on a corresponding said projecting boss of said lugs, and disposed for operative connection at respective second ends to the other of said movable member and said structural member, said second connecting links, projecting bosses, and lugs providing a second load bearing path between said structural member and said movable member.

5. The connector as recited in claim 4 further comprising means for connecting said second connecting links to said first connecting link for movement therewith.

* * * * *

UNITED STATES PATENT AND TRADEMARK OFFICE
CERTIFICATE OF CORRECTION

PATENT NO. : 4,786,202

DATED : November 22, 1988

INVENTOR(S) : Alison M. Arnold et al

It is certified that error appears in the above-identified patent and that said Letters Patent is hereby corrected as shown below:

In the ABSTRACT, line 31, "of fuctionally" should be ---to functionally---.
Col 1, line 16, "fall-safe" should be ---fail-safe---.
Col 1, line 24, after "However" should appear a comma (,).
Col 1, line 28, after "applications" should appear a comma (,).
Col 1, line 57, "Provide" should be ---provide---.
Col 1, line 67, "pivotal" should be ---pivotally---.
Col 2, line 19, after "link" should appear a comma (,).
Col 2, line 25, after "connecting" should appear ---link,---.
Col 2, line 26, after "pair" should appear a comma (,).
Col 2, line 62, "cf" should be ---of---.
Col 3, line 1, "12.13" should be ---12,13---.
Col 3, line 12, after "schematically" should appear ---by---.
Col 3, line 18, "hearing" should be ---bearing---.
Col 3, line 26, "out" should be deleted.
Col 3, line 31, after "members" should appear a period (.).
Col 3, line 33, "21. Pin" should be ---21, pin---.
Col 3, line 60, "of" should be ---for---.

UNITED STATES PATENT AND TRADEMARK OFFICE
CERTIFICATE OF CORRECTION

PATENT NO. : 4,786,202

DATED : November 22, 1988

INVENTOR(S) : Alison M. Arnold et al

It is certified that error appears in the above-identified patent and that said Letters Patent is hereby corrected as shown below:

Col 4, line 8, "buss" should be ---boss---.
Col 4, line 23, "characterized" should be ---characterizes---.
Col 4, line 30, after "which" should appear ---are---.
Col 4, line 33, after "presents" should appear ---an---.
Col 4, line 56, "of", second occurrence, should be ---or---.
Col 6, line 15, in claim 4, "upwardly" should be ---outwardly---.
Col 6, line 21, in claim 4, "eyelets" should be ---eyelet---.

Signed and Sealed this

Eighteenth Day of July, 1989

Attest:

DONALD J. QUIGG

Attesting Officer

Commissioner of Patents and Trademarks